United States Patent
Schadt et al.

(10) Patent No.: US 6,734,936 B1
(45) Date of Patent: May 11, 2004

(54) OPTICAL ELEMENT CONTAINING AN OPTICALLY ANISOTROPIC LAYER HAVING AT LEAST TWO REGIONS WITH DIFFERENT MOLECULAR ORIENTATIONS

(75) Inventors: Martin Schadt, Seltisberg (CH); Hubert Seiberle, Weil am Rhein (DE)

(73) Assignee: Rolic, AG, Zug (CH)

( * ) Notice: Subject to any disclaimer, the term of this patent is extended or adjusted under 35 U.S.C. 154(b) by 0 days.

(21) Appl. No.: 09/435,466

(22) Filed: Nov. 8, 1999

Related U.S. Application Data

(63) Continuation of application No. PCT/IB98/00687, filed on May 8, 1998.

(30) Foreign Application Priority Data

May 9, 1997 (SE) ................................................ 1082/97

(51) Int. Cl.⁷ ...................... G02F 1/1335; G02F 1/1337
(52) U.S. Cl. ........................... 349/117; 349/96; 349/98; 349/124
(58) Field of Search ............................. 349/96, 98, 117, 349/124; 428/641, 65, 457

(56) References Cited

U.S. PATENT DOCUMENTS

| | | | |
|---|---|---|---|
| 4,472,627 A | | 9/1984 | Weinberger |
| 4,536,014 A | * | 8/1985 | Boutaleb et al. ............... 283/83 |
| 5,204,763 A | | 4/1993 | Hikmet |
| 5,262,882 A | | 11/1993 | Hikmet |
| 5,327,271 A | | 7/1994 | Takeuchi et al. |
| 5,333,074 A | | 7/1994 | Hikmet |
| 5,464,669 A | * | 11/1995 | Kang et al. ..................... 428/1 |
| 5,548,422 A | | 8/1996 | Conner et al. |
| 5,549,953 A | | 8/1996 | Li |
| 5,589,959 A | | 12/1996 | Hikmet |
| 5,602,661 A | | 2/1997 | Schadt et al. |
| 5,678,863 A | * | 10/1997 | Knight et al. ................ 283/113 |
| 6,160,597 A | * | 12/2000 | Schadt et al. .................. 349/98 |
| 6,369,869 B2 | * | 4/2002 | Schadt et al. ................ 349/129 |

FOREIGN PATENT DOCUMENTS

| | | |
|---|---|---|
| EP | 0 347 063 A | 12/1989 |
| EP | 0 689 065 A | 12/1995 |
| EP | 0 689 084 A | 12/1995 |
| EP | 0 753 785 A | 1/1997 |
| EP | 0 768 560 A | 4/1997 |
| EP | 0 770 889 A | 5/1997 |
| GB | 2 286 058 A | 8/1995 |
| JP | 09068926 | 11/1997 |

* cited by examiner

*Primary Examiner*—Tarifur R. Chowdhury
(74) *Attorney, Agent, or Firm*—Finnegan, Henderson, Farabow, Garrett & Dunner, L.L.P.

(57) ABSTRACT

A component has a substrate (1) made of a transparent material, for example glass. On this layer (1), there is a linear polarizer (2) on which there is a layer (3) of a photo-oriented polymer network (PPN)(-LPP) which is oriented in locally varying fashion via its surface which covers the substrate. The layer (3) is adjoined by an anisotropic layer (4) of cross-linked liquid-crystal monomers. This layer (4) then has a molecular arrangement whose orientation is defined by the underlying orientation layer (3). The layer (4) will have been photocross-linked by exposure to a suitable wavelength of light, with the result that the molecular orientation defined by the PPN layer (3) is fixed. The element, denoted as a whole by 7, can then be used as an optical component which is protected against forgery, it being possible for the orientation pattern of the liquid-crystal layer or the optical information stored therein to be made visible by means of an external polarizer (5), for example.

8 Claims, 4 Drawing Sheets

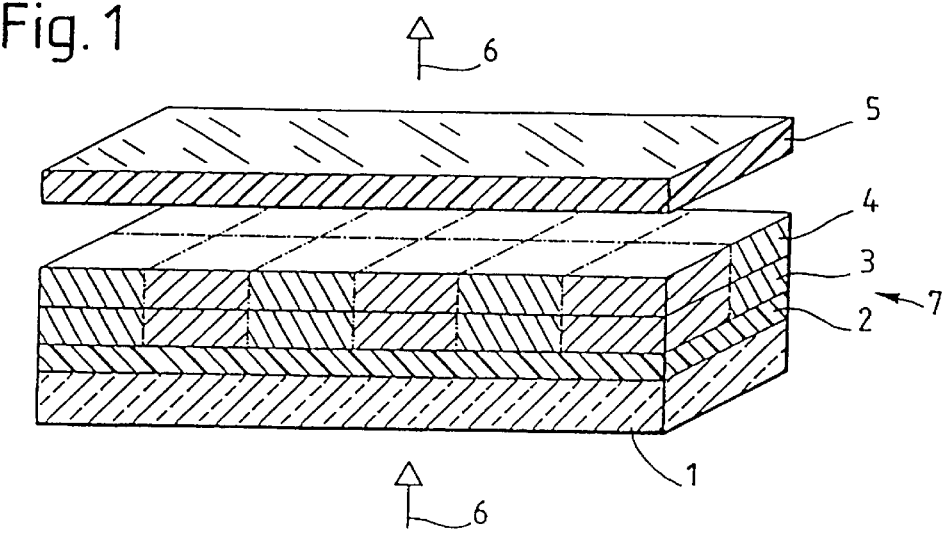
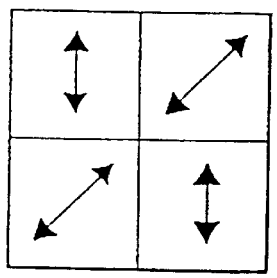
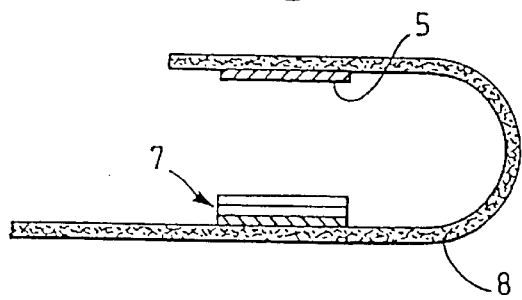
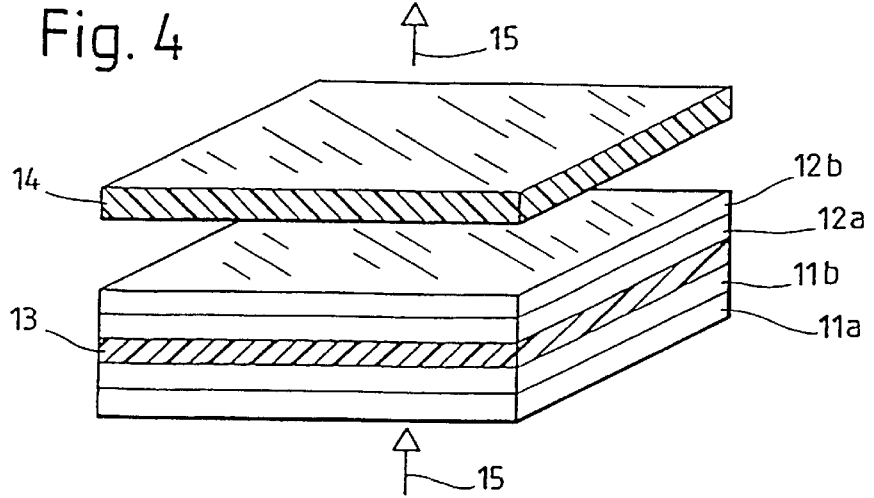

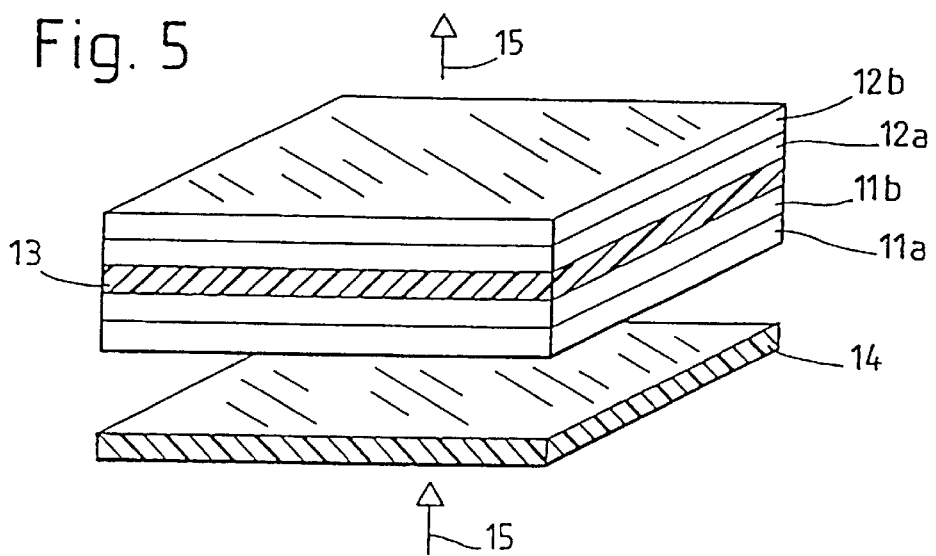
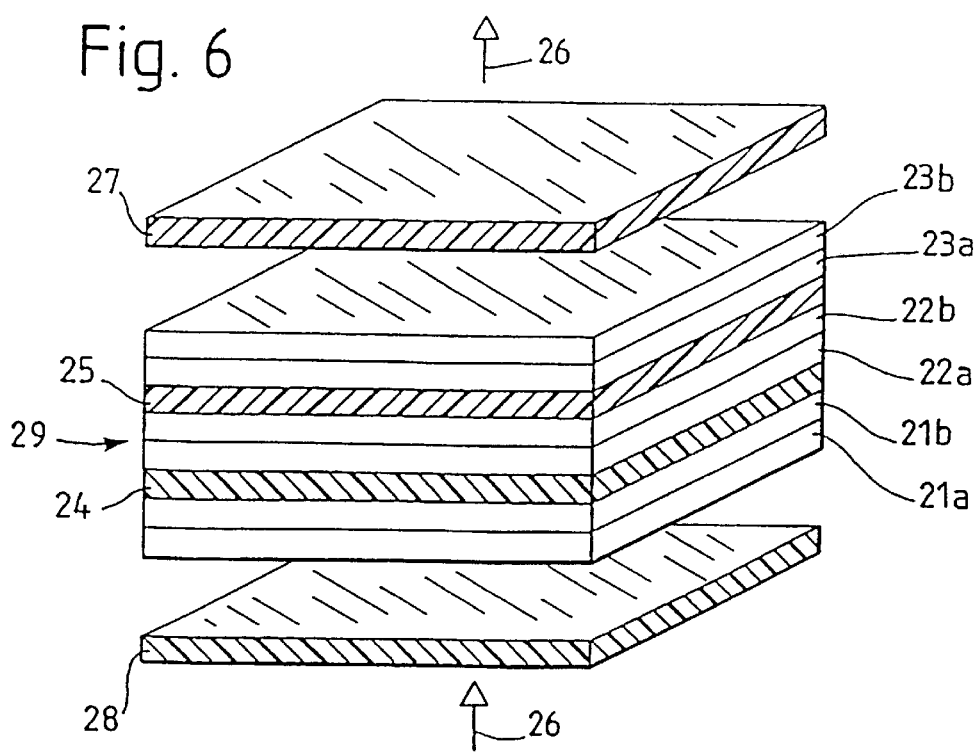

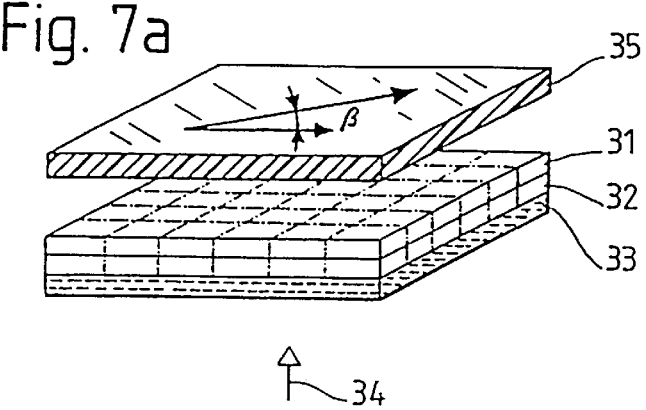 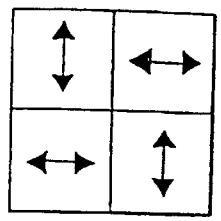
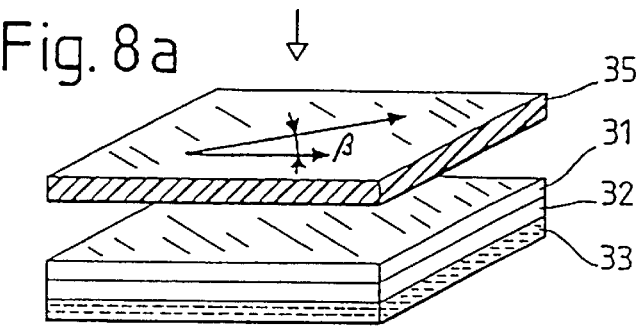 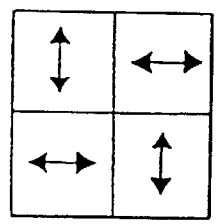
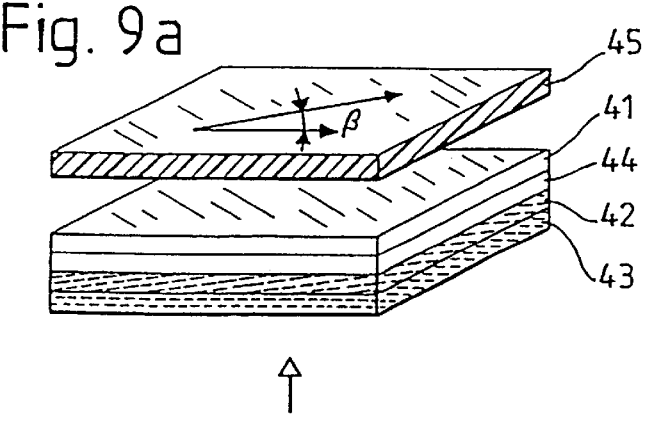 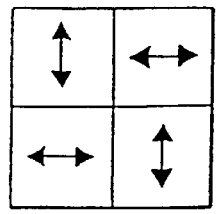

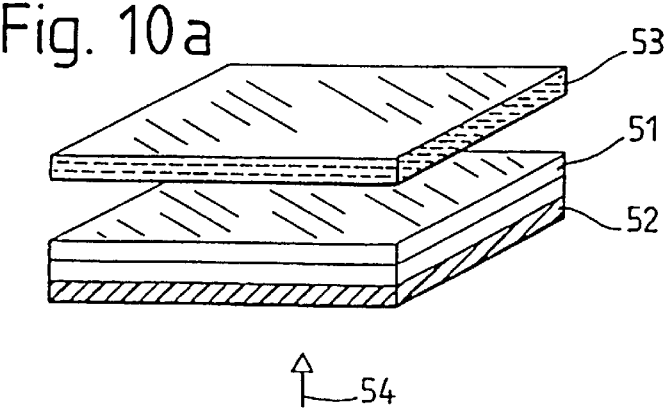
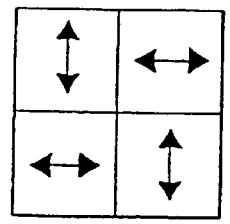
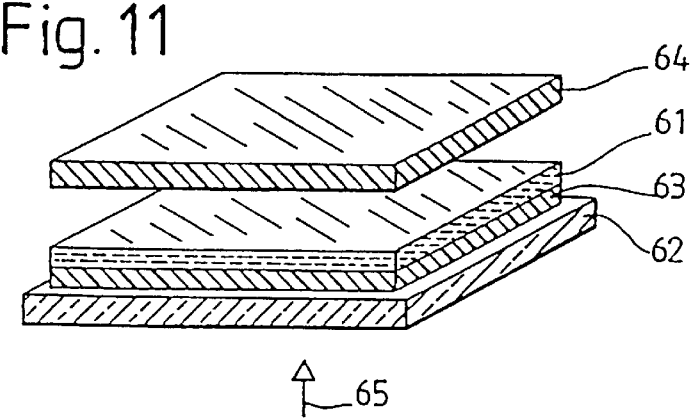
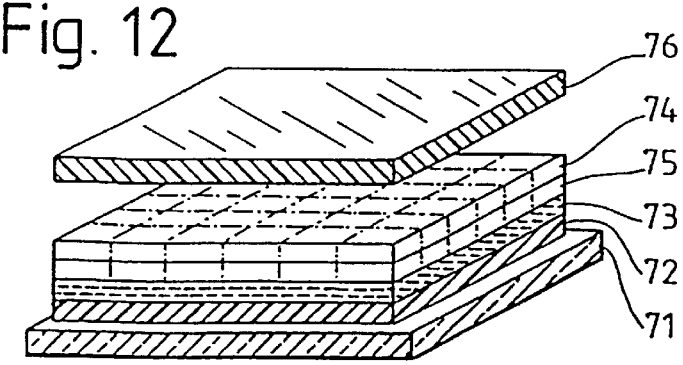

OPTICAL ELEMENT CONTAINING AN OPTICALLY ANISOTROPIC LAYER HAVING AT LEAST TWO REGIONS WITH DIFFERENT MOLECULAR ORIENTATIONS

This application is a continuation of International Application No. PCT/IB98/00687, filed May 8, 1998, the content of which is incorporated herein by reference.

The invention relates to an optical component containing an optically anisotropic layer, which latter has at least two regions with different molecular orientations. The anisotropic layer may, for example, be a retarder layer formed by cross-linked liquid-crystal monomers.

A particular use of the components according to the invention is in the field of protection against forgery and copying.

The demand for safeguarding banknotes, credit cards, securities, identity cards and the like against forgery is increasing constantly on account of the high-quality copying techniques which are available. Furthermore, in low-wage countries, imitations of branded products and copies of copyright-protected products, for example compact discs, computer software, electronics chips, etc. have been produced and exported worldwide. Because of the increasing number of forgeries, there is therefore a great need for new elements which are safeguarded against forgery and can be identified both visually and by machine.

In the field of copy-protecting banknotes, credit cards etc, there are already a considerable number of authentication elements. Depending on the value of the document to be protected, very simple or relatively highly complex elements arc employed. Some countries are content to provide banknotes with metal strips which come out black on a photocopy. Although this prevents them from being copied, elements of this type are very easy to imitate. In contrast to this, there are also more complex authentication elements, for example holograms and cinegrams. Authentication elements of this type are based on the diffraction of light by gratings and need to be observed under different viewing angles in order to verify their authenticity. These diffracted elements produce three-dimensional images, colour variations or kinematic effects which depend on the angle of observation and have to be checked on the basis of predetermined criteria or rules. It is not practically possible to use machines for reading information, for example images or numbers, encoded using this technique. Furthermore, the information content of these elements is very limited, and only an optical specialist will be capable of discriminating definitively between forgeries and an original.

Lastly, one should not ignore the fact that diffractive optical effects have in the course of time also been used outside the field of security, in particular for consumer articles such as wrapping paper, toys and the like, and the production methods for such elements have in the course of time become known to a large group of people and are correspondingly straightforward to imitate.

Further to the diffractive elements mentioned above, other components are also known which are suitable for optimum copy protection. These include optical components, as disclosed for example by EP-A 689,084 or EP-A 689,065, that is to say components with an anisotropic liquid-crystal layer, which latter has local structuring of the molecular orientation.

These components are based on a hybrid layer structure which consists of an orientation layer and a layer which is in contact with it and consists of liquid-crystal monomers cross-linked with one another. In this case, the orientation layer consists of a photo-orientable polymer network (PPN)—synonymous with LPP used in other literature which, in the oriented state, through a predetermined array, defines regions of alternating orientations. During the production of the liquid-crystal layer structure, the liquid-crystal monomers are zonally oriented through interaction with the PPN layer. This orientation which, in particular, is characterized by a spatially dependent variation of the direction of the optical axis, is fixed by a subsequent cross-linking step, after which a cross-linked, optically structured liquid crystal (LCP for liquid crystal polymer) with a preestablished orientation pattern is formed. Under observation without additional aids, both the orientation pattern itself and the information written into the liquid crystal before the liquid-crystal monomers are cross-linked, are at first invisible. The layers have a transparent appearance. If the substrate on which the layers are located transmits light, then the LCP orientation pattern or the information which has been written become visible if the optical element is placed between two polarizers. If the birefringent liquid-crystal layer is located on a reflecting layer, then the pattern, or the corresponding information, can be made visible using only a single polarizer which is held over the element. LCP authentication elements make it possible to store information, virtually without restriction, in the form of text, images, photographs and combinations thereof. In comparison with prior art authentication elements, the LCP elements are distinguished in that the authenticity of the security feature can be verified even by a layman since it is not first necessary to learn how to recognise complicated colour changes or kinematic effects. Since LCP authentication elements are very simple, reliable and quick to read, machine-readable as well as visual information can be combined in the same authentication element.

As is likewise already known, the complexity of LCP authentication elements can be increased further by inclining the optical axis of the LCP layer relative to the plane of the layer, uniformly or with local variation. This can be done in known fashion by producing a PPN layer with a locally varying tilt angle on the surface. This further provides a tilt effect, that is to say the information contained in the birefringent layer is seen with positive or negative contrast depending on the angle of observation. The object of the invention is now to provide further possible layer structures of the above-mentioned type for optical components, electro-optical devices and, in particular, for copy protection elements.

According to the invention, this is achieved in that the physical parameters and the configuration of the cross-linked liquid-crystal layer are varied and/or different layers, as well as a variety of substrates, with differing respective optical properties are combined. Since the layers which are used are generally transparent, they can also be applied successfully to already known, permanently visible authentication elements, for example watermarks, holograms or cinegrams. The retarder pattern of the liquid-crystal layer can then be seen in addition to the permanently visible authentication element on observation using a linear polarizer.

When using the transmissive birefringent layers described in EP-A 689,084, it is necessary to arrange one polarizer on each side of the element in order to read or make visible the information which is stored. A quick check of identity cards and the like is in this case made difficult by the involved positioning of the two polarizers above and below the authentication element. This disadvantage can be removed according to the invention by additionally integrating at least one polarization layer in the layer structure. If there is, for example, a polarization layer below the birefringent layer, then one external polarization sheet, held over the element, is sufficient for making the stored optical information visible.

A polarization layer integrated in the authentication element can, according to EP-A 689,084, be designed as a dichroic LCP layer. It is also possible to use a polarization sheet as a substrate for the PPN and LCP layers applied to it.

Where a reflector is present, which can be omitted according to this invention, the polariser sheet may possibly be the polariser for ingoing light and the analyser for outgoing light, which may not always be desirable.

A further disadvantage of the authentication elements described in EP-A 689,084 is that, when arranging a polarizer below the substrate, the polarization state of the light on passing through the substrate can be affected. If, for example, use is made of inexpensive polymer substrates which, by virtue of the way in which they are produced, are themselves birefringent then since the birefringence of these substrates is a random result of manufacture and varies from place to place, the birefringence of the LCP layer may, in the extreme case, be cancelled out, with the result that the information of the authentication element can no longer be read. Furthermore, the use of strongly scattering materials such as paper as a substrate is ruled out since polarized light would be immediately depolarized by these materials, so that the polarization state of the light which passes through and is analyzed using the second polarizer is unidentified and does not therefore carry any coded information.

However, if the integrated polarizer is, as proposed according to the invention, located between the substrate and the LCP layer, then the substrate has no effect on the polarization state of the light on passing through the LCP layer. As a result, on the one hand, it is possible to use inexpensive polymer substrates which, by virtue of the way in which they are produced, are themselves birefringent, and on the other hand the substrate need not be transparent. In this case, even scattering substrate materials can, for example paper and the like, are thus appropriate.

There are a variety of products, for example paintings, documents, photographs, compact discs, semiconductor chips, in which the authentication element need not be visible since this would impair the overall appearance of the product or would draw the attention of a potential product forger to the authentication element. For these cases, the invention proposes that orientable fluorescent dyes be incorporated in a transmissive structured LCP layer.

There are yet further optical effects which can be used for liquid-crystal authentication elements. Examples include those produced by cholesteric filters. A known feature of these filters is that they refract, with circular polarization, a fraction of the visible light spectrum in a wavelength range depending on physical parameters, while the unreflected light is transmitted (see: Schadt M., Fünfschilling J., Jpn. J. Appl. Phys., 29 (1990) 1974). The effect of this is that the transmitted light and the reflected light have different colours. In order for this to produce visual effects, it is necessary for the wavelength range of the selective reflection to lie in the visible light range. For applications in which the information is read by machine, it is of course possible for the refraction band to lie outside the visible wavelength range.

Different types of optical components, which can likewise be used as authentication elements in the field of copy protection, are based on the combination of a linear polarizer, with a cholesteric filter. A configuration of this type makes it possible (as also further explained below) to produce different colours, for which use is in particular made of a second linear polarizer arranged on the opposite side of the cholesteric filter from the first polarizer.

Lastly, the tilt effect described at the start can also be produced in a different way than is already known. It is thus possible, according to the invention, to produce authentication elements whose tilt effects are more pronounced and whose production is even simpler from a technical point of view. This is achieved, in particular, in that at least one birefringent LCP layer of an element is constructed in such a way that its effective birefringence depends on the angle of observation. In this case, the optical axis may lie in the plane of the layer, i.e. it is not necessary to incur the extra cost of tilting the optical axis out of the plane in a defined way.

According to the present invention, there is provided an optical component comprising at least two layers, characterized by a retarder and a polarizer, the retarder having at least two regions with different optical axes. Preferably the retarder comprises an anisotropic layer comprising cross-linked liquid-crystal monomers. The retarder may be placed on an orientation layer and the orientation layer may be in contact with a polarizer. The orientation layer preferably comprises a photo-oriented polymer network (PPN). The polariser may be placed on a substrate. Optionally, a second polariser is arranged over the liquid-crystal layer and a further orientation layer and further liquid-crystal layer are arranged over this second polariser, and the second liquid-crystal layer may also be structured. A further polariser may be arranged over the second liquid-crystal layer, and a third orientation layer and a third liquid-crystal layer are arranged over this further polariser, and the third liquid-crystal layer may also be structured. An element for protection against forgery and/or copying may have an optical component as set forth above and an external linear or circular polarizer, the liquid-crystal layer encoding information which can be analyzed using the external polarizer. Such an element may be characterised in that the at least two liquid-crystal layers each encode a partial information content which together form a total information content. In this element, the liquid-crystal layer may be designed as a retarder and is preferably placed on a substrate characterized in that the substrate encodes a part of the total information content. Preferably, the external linear polarizer is structured, and both the liquid-crystal layer and the external polarizer each encode part of the total information content.

The optical component may be characterised by at least one circular polarizer, or preferably by two circular polarizers arranged one above the other, one of which rotates to the left and the other of which rotates to the right. An element for protection against forgery and/or copying may contain such an optical component and an external linear or circular polarizer for analysing the encoded information.

The invention also provides an optical component comprising an optically anisotropic layer which is formed by liquid-crystal molecules, characterised in that the optically anisotropic layer contains fluorescent molecules, and preferably has at least regions with different optical axes. The invention extends to an element for protection against forgery and/or copying including such an optical component.

The invention also provides an optical component comprising at least two layers, characterized by a cholesteric layer and a linear polarizer and preferably by an optically anisotropic layer, which may have regions with different optical axes. The optically anisotropic layer may be formed of cross-linked liquid crystal molecules. The cholesteric layer and the optically anisotropic layer are preferably on the same side of the linear polariser, which may be in contact with the cholesteric layer. The linear polariser may be arranged on a substrate, the cholesteric layer being in contact with the linear polariser, and an orientation layer may be placed on the cholesteric layer, and an optically anisotropic layer of cross-linked liquid-crystal monomers may be placed on the orientation layer, the liquid crystal (optically anisotropic) layer forming regions with different molecular orientations. An element for protection against forgery and/or copying have such an optical component and an external linear polarizer for analysing the information encoded in the liquid-crystal layer and/or in the cholesteric layer.

The invention also provides an optical component, containing a birefringent liquid-crystal layer which has at least two regions with different optical axes, characterized in that the optical delay of the liquid-crystal layer in the individual regions depends differently on the angle of observation. This component may be designed in such a way that the colour of the element on observation through a polarizer differs locally, and may be biaxial; preferably the birefringent layer is biaxial. An element for protection against forgery and/or copying may have such an optical component. A further element, according to the invention, for protection against forgery and/or copying comprises a polariser layer which has at least two regions with different polarisation directions.

A further such element is arranged on a substrate and comprises an optically anisotropic layer which has at least two regions with different optical axes, the substrate being a reflective polariser.

The invention also provides a device for protection against forgery and/or copying, wherein an element of any of the types set forth above and an analyser are arranged on the same substrate, such as a certificate or banknote.

Some of these may be considered as documents carrying invisible proof of authenticity, often in polarised light form. Some such documents, lacking a reflective layer, may be authenticable using illumination from underneath (transmitted through the document to the viewer). Some such documents may advantageously lack an integrated polariser.

Illustrative embodiments of the invention will now be described below with reference to the appended drawing. In a simplified schematic representation, FIG. 1 shows a layer structure of an optical component consisting of a polarizer, a PPN layer and an LCP layer, as well as the associated analyzer, FIG. 2 shows the LCP structuring of the component in FIG. 1, FIG. 3 shows a foldable document with an element of the type characterized in FIG. 1, FIG. 4 shows a layer structure constructed in an alternative way to the structure in FIG. 1, with an additional PPN layer and LCP layer, as well as an analyzer which is arranged after the layer structure in the direction in which light travels, FIG. 5 shows a layer structure constructed in an alternative way to the structure in FIG. 1, with an additional PPN layer and LCP layer, as well as an analyzer which is arranged before the layer structure in the direction in which light travels, FIG. 6 shows a layer structure constructed in an alternative way to the structure in FIG. 1, with two additional PPN and LCP layers, as well as two external polarizers on opposite sides, FIGS. 7a and 7b show an LCP component which has a locally different orientation and a cholesteric filter, as well as a polarizer arranged after the element in the direction in which light travels, FIGS. 8a and 8b show a layer structure which is of the type shown in FIG. 7, but with a polarizer arranged before the element in the direction in which light travels, FIGS. 9a and 9b show a layer structure which is of the type shown in FIG. 7 but with an additional cholesteric filter, FIGS. 10a and 10b show a layer structure which is of the type shown in FIG. 7, but in which the cholesteric filter and the polarizer are interchanged, FIG. 11 shows a two-layer authentication element consisting of a cholesteric filter and a first linear polarizer, as well as an associated analyzer, and FIG. 12 shows a layer structure as in FIG. 11, but with an additional retarder layer.

The schematic section represented in FIG. 1 through a layer structure of a first illustrative embodiment according to the invention shows a substrate 1, made of a transparent material such as glass, for example, or of a scattering material, such as paper, for example. On the substrate, there is a linear polarizer 2, on which there is a layer 3 of a photo-oriented polymer network (PPN) whose orientation varies locally (e.g. imagewise) over its surface on the substrate. Examples of materials which are suitable for this include cinnamic acid derivatives, as described for example in EP-A 525,478 or U.S. Pat. No. 5,389,698. They are oriented and at the same time cross-linked by selective exposure to linearly polarized UV light.

An anisotropic layer 4 of cross-linked liquid-crystal monomers adjoins the layer 3. This LCP layer 4 consists in this case of a molecular arrangement whose orientation is predetermined by the orientation of the underlying layer 2. Using light of a suitable wavelength, the LCP layer 4 is photo-cross-linked, by means of which the molecular orientation defined by the PPN layer 3 is fixed. Using an external polarizer 5, the orientation pattern or the stored optical information (i.e. the image) can be made visible, for which purpose light passes from below in the direction of the arrow 6 through the element denoted overall as 7, and the polarizer 5 (acting in this case as an analyzer) is held over the element 7.

FIG. 2 shows the preferred mutual orientation of the optical axes of adjacent locally structured regions of the LCP layer 4. In order to produce maximum contrast, the optical axes of adjacent regions are angled at 45°.

FIG. 3 shows a variant, still according to the invention for simplifying the verification of such LCP security items. In this case, the second (external) polarizer 5 is mounted on a light-transmitting flexible substrate 8, such as a document or a banknote. This is done in such a way that the polarizer 5 can be positioned over the element 7 mounted elsewhere on the same banknote, by folding or bending the banknote 8, so that the stored LCP image can be seen through the polarizer 5 on looking through. In this way, both polarizers needed for recognizing the stored authentication element are present on the same substrate, with the result that it is not necessary to have external polarizers, and thus no further aids for analysing the information are necessary.

Of course, the second polarizer 5 may itself again form part of a layer structure which in turn bears an LCP layer. On the one hand, there are then simultaneously two LCP layer structures on one substrate, with information content which can be made visible separately from one another as individual patterns, in each case using an external polarizer. On the other hand, the optical anisotropies of the two LCP layers can also be combined with one another if the substrate is bent and then viewed through two polarizers. In this case, a third pattern is produced which differs from the two individual patterns.

Complexity, surprise, and the optical quality and information content can all be increased according to the invention by making the layer structure of two information-carrying LCP layers sandwiching a polarization layer. Depending on whether a second, external polarizer is then arranged above or below the layer structure, one or other of the information contents can be seen. The arrangement of the layers of corresponding elements are represented schematically in FIGS. 4 and 5. In this case, the two PPN and LCP layers, respectively together forming a pair, are denoted 11a and 11b or 12a and 12b, respectively, and the polarizer layer arranged between the two pairs is denoted 13. The external polarizer which acts as an analyzer is here denoted 14a or 14b, and the direction of the light is denoted 15.

If, however, one external polarizer, notionally 14a and 14b (not shown), is arranged both above and below, then both information contents are seen at the same time. If one or both external polarizers are rotated through 90°, the information contents will be inverted independently of one another, that is to say represented in negative. For example, an image could be stored in one of the two LCP layers and corresponding textual information could be written in the other. By choosing the arrangement of the polarizer, it is then possible to make only the image or only the text visible, or both visible at the same time.

Analogously with the examples described above with reference to FIGS. 1 to 5, the number of PPN and LCP layers can be increased further. In the case of an element 29 having a three-layer structure (FIG. 6), the layers 21a/21b, 22a/22b and 23a/23b are separated from one another by two crossed polarizer layers 24 and 25. In this layer structure, the central LCP layer 22b arranged between the two polarizers 24 and 25 can be produced according to the method disclosed in EP-A 689,084. With light 26 incident at right angles to the plane of the layer, the information in the central layer 22b is in this case permanently visible, while the information in the upper or lower LCP layers 23b and 21b, respectively, can as described above be made visible by arranging an external polarizer 27 or 28 above or below the element 29. If both the polarizer 27 and the polarizer 28 are applied simultaneously to each side of the element 29, then the information in all three LCP layers can be made visible at the same time. In this way, for example, a single image can be broken down and distributed between the three LCP layers 21b, 22b and 23b. Only by arranging one or two external polarizers will the individual parts of the image be recombined to form the original image.

The information in the central LCP layer may, however, also be coded through locally varying tilt angle, or through tilt effects of the type which will be described below, that is to say, for example, through spatially varying directions of the optical axis relative to the plane of the layer. The result of this, in the case of the layer system consisting of three LCP layers with polarization layers lying in between, is that the information in the central image cannot initially be seen so long as the layer is viewed at right angles. Only on observation at an oblique angle does the information in the central layer become visible, because of the different birefringence of regions with different tilt directions for the optical axis. By using one or two external polarizers, the information contents of the lower and/or upper layers are then visible at the same time as the information in the central layer.

The complexity can be increased by further LCP layers which are respectively separated from the others by polarization layers. The information in each of the LCP layers can thus be stored differently, for example through local variation of the direction of the optical axis in the plane as well as out of the plane. As a result, the information content in the individual layers can be viewed independently of each other according to the angle of observation and the arrangement of external polarizers.

Linearly polarizing layers can also be produced using LCP layers which contain dichroic dye molecules. The dichroic molecules orient in such layers according to the local orientation of the LCP molecules, so that light is linearly polarized locally in the layer, that is to say according to the orientation of the dichroic dye molecules. By structuring the doped LCP layer, it is thereby possible to produce polarization layers with locally differing polarization direction. The brightness and/or colour of the birefringent layer between two polarizers depends on the direction of the optical axis of the retarder layer, as well as on the transmission directions of the two polarizers, one (or both) of the polarizers needed to visualize the retarder pattern can themselves be structured and therefore carry information. The patterns in the retarders and polarizers can then be matched with one another. It is thus possible to put one part of the information in the LCP layer and another part in the polarization layer. The total information content can then be read only by an individual who is provided with the structured polarizer matching the retarder layer. If there is a reflector under the structured retarder layer, then the second (optionally unstructured) polarizer underneath the retarder layer is no longer required for reading the information. However, just as part of the information content can be put in the analyzer, part of the information may already be present permanently on the substrate. In this way, for example, a photograph can be broken down into a part permanently visible on the substrate, and an initially invisible part which is put in the retarder layer and cannot be seen unless a polarizer is used. In the case of a LCP pattern on a reflector, a further variant could be the reflector itself structured. On observation through a polarizer, the additional information which is stored in the structured retarder layer is then seen inside the reflecting regions.

As already mentioned at the start, there a variety of products, for example paintings, documents, photographs, compact discs and semiconductor chips, in which the authentication element is not intended to be visible. Transmissive structured retarder layers would satisfy this condition, but in order to visualize the information which they contain, a polarizer is placed before and after the retarder layer, which is possible only if the substrate does not alter the polarization state of the light. In contrast, in the case of reflective elements based on structured retarders, it is necessary for there to be a reflector, which as a rule can always be seen, under the retarder layer.

For cases of this type, it is a further object to provide an authentication element which although carrying retrievable information, cannot be seen under normal conditions. According to the invention, this is achieved in that the orientable fluorescent dyes, which either fluoresce anisotropically or (and) absorb light anisotropically and have absorption bands in the UV range, are incorporated in a structured LCP layer. If the fluorescent molecules arc chosen suitably, than on exposure to polarized UV light, those molecules whose transition moment is parallel to the polarization direction of the exciting UV light, are preferably excited. In an LCP layer in which the fluorescent molecules are zonally perpendicular to one another in accordance with the LCP orientation, only those regions whose orientation is parallel to the polarization direction of the UV light will consequently fluoresce, and this makes it possible to see the information stored in the layer which is invisible in the absence of UV excitation.

As an alternative, the doped LCP layer may also be excited with isotropic light. If the fluorescent molecules are chosen suitably, they radiate the fluorescent light with a polarization, the direction of the polarization being determined by the orientation of the molecules. Using a polarizer, it is possible to discriminate between regions with different polarization of fluorescent light, and this makes it possible to see the information present in the layer.

FIGS. 7 to 10 show optical elements with at least one cholesteric filter which, as already mentioned at the start, can also be used for authentication elements with cross-linked liquid-crystal molecules.

In a first illustrative embodiment (FIGS. 7a and 7b) of this category of elements, use is made of a structured LCP retarder layer 31 whose optical delay or path difference is $\lambda/4$, and in which the information is encoded by means of regions whose optical axes are perpendicular to one another. If a cholesteric filter 33 whose selective reflection wavelength $\lambda_R$ lies in the visible light range is then placed under this structured retarder layer 31, or under its PPN orientation layer 32, then light passing through the cholesteric filter in the direction of the arrow 34 from below, will first be circularly polarized in the region of the selective bands. On passing through the structure retarder layer 31, the circularly polarized light will then be converted into linearly polarized light because of the $\lambda_R/4$ optical delay. Since, as represented in FIG. 7b, the optical axes in the differently oriented regions are perpendicular to one another, the polarization direction of the linearly polarized light after passing through the corresponding regions is also rotated through 90° relative to one another. If a linear polarizer 35 having a transmission angle $\beta=45°$, measured relative to the directions of the mutually perpendicular optical axes of the retarder layer 31, is then held over this arrangement, then coloured and colourless regions will be seen. When the polarization 35 is rotated through 90°, the optical properties of the regions will be interchanged.

On the other hand, if the light is not put into the element through the arrangement consisting of the filter 33, the PPN layer 32 and the retarder layer 31, but is incident through the linear polarizer from above, as shown in FIG. 8, then the pattern which has been written will be seen in complementary colours in the reflective light. In this way, it is possible to produce authentication elements with high information content, in which the information appears as complementary colours depending on whether the transmitted or reflected light is observed.

Both the circular polarizer and the linear polarizer may form part of the layer structure, in which case they are permanently present. They may, however, be arranged above or below the layer only when the information is read. A circular polarizer layer may, for example, be formed from a layer of chiral LCP material which is only a few micrometres thick.

The element represented in FIG. 9a has a similar design to the element in FIG. 7, and has a structured retarder layer 41 with an optical delay of about $\lambda/4$. In this case as well, the information is encoded by means of regions with mutually perpendicular optical axes, as shown in FIG. 9b. In this illustrative embodiment, however, one left-rotating and one right-rotating cholesteric filter 42 and 43, respectively, are arranged in series under the PPN layer 44 belonging to the retarder layer 41. The maxima of the selected reflection bands of the two filters 42 and 43 lie in different wavelength ranges. If a linear polarizer 45 is again held over the structured retarder layer, then the regions with mutually perpendicular optical axes appear with different colours. When the polarizer or the retarder layer is rotated through 90°, the colours of the regions are interchanged.

A final further element in this category is shown by FIGS. 10a and 10b. In this case as well, use is made of a structured $\lambda/4$ retarder layer 51, in which the information is encoded by means of regions with mutually perpendicular optical axes. In contrast to the example in FIG. 7, the linear polarizer 52 and the cholesteric filter 53 are in this case interchanged. Light incident form below in the direction of the arrow 54 will firstly undergo uniform linear polarization by the linear polarizer 52 and, on passing through the structured retarder layer 51, will become left or right circularly polarized depending on the direction of the optical axis. If a cholesteric filter 53 which acts as a circular polarizer is held above, then either left or right circularly polarized light will be transmitted, depending on the sense of rotation of the circular polarizer, and light with the opposite sense of rotation will be reflected. The pattern written in the retarder layer 51, encoded by different optical axis directions, then appears as a pattern of bright coloured regions.

If, in this special case, the circular polarizer 53 is replaced by a second linear polarizer, then the pattern cannot be seen since the polarization state of the light after passing through the regions of the retarder layer 51 is either right or left circularly polarized.

The fact that retarder regions whose optical axes are mutually perpendicular cannot be distinguished using linear polarizers, opens up the possibility of writing different information contents in an LCP layer, it being possible for these to be read independently of one another using different aids. To do this, for example, first information, as described in the illustrative embodiment in FIG. 10, can be encoded using regions with mutually perpendicular optical axes. Second information is then encoded using regions whose optical axes make an angle of 45° with the mutually perpendicular axes in the said first regions. If, as described in the illustrative embodiment in FIG. 10, a linear polarizer is placed under the retarder layer and the layer is illuminated through it, then only the second information is seen when using a second linear polarizer which is held over the element formed by the linear polarizer, PPN layer and LCP layer. In contrast, the first information is seen with a normal observation angle, only if (as already explained) a circular polarizer instead of the linear polarizer is held over the retarder layer, and in this case the second information can also be seen with a reduced intensity. In an authentication element, it would thus, for example, be possible to have a polarization layer permanently integrated under the structured retarder layer, so that in order to verify the authenticity of the element, it is sufficient to hold the linear polarizer and circular polarizer successively over the said element in order to see the different information contents.

Lastly, it will be pointed in this regard that, when at least one cholesteric filter is used, there is the further possibility, in order to visualize a retarder structure, of not using any linear polarizers, but only using circular polarizers. The information is, for this purpose, recorded by structuring the optical delay in the retarder layer, it then being possible for the optical axis to have the same direction throughout the plane of the layer. If a retarder layer of this type is placed between two cholesteric filters whose selective reflection bands overlap, then the information which is written will be visible or readable.

As already mentioned at the start, there is a further possibility of developing optical authentication elements which are essentially formed by a cholesteric filter and two linear polarizers.

This is because combining a linear polarizer with a cholesteric filter makes it possible to produce different colours if a second linear polarizer, used as an analyzer, is arranged on the opposite side of the cholesteric filter from the first polarizer.

In the simplest case, an authentication element employing this effect would consist only of one cholesteric layer. In order to produce an optical effect usable for authentication elements, it is then necessary to have two linear polarizers which, as required, are to be held over or under the cholesteric layer. In this simple case, the cholesteric layer may only be applied to a transparent substrate, for example glass. However, if the authentication element is to be applied to a diffuse depolarizing substrate, then the first polarizer may be integrated permanently in the authentication element. An authentication element of this type is represented in FIG. 11. This element consists of a cholesteric layer 61, a substrate 62 and a first polarizer 63, arranged between the substrate 62 and the layer 61. The second linear polarizer, required for observing the stored information, is denoted 64 and, when required, should be held over the said element.

The colour of the light passing in the direction of the arrow 65 through the linear polarizer 63 in the cholesteric filter 61 is firstly determined by the wavelength of the selective reflection of the cholesteric filter 61. If the external linear polarizer 64 is then held over the cholesteric layer, then the colour changes when the polarizer 64 is rotated. If, for example, use is made of a cholesteric filter 61 which reflects the colour green, then it firstly appears red-violet in transmission. Conversely, if the layer is observed through the second polarizer 64, then on rotation of this polarizer the colours yellow, green, red or blue are seen.

If a uniaxial optical delay layer with a path difference of for example, $\lambda/2$, is then placed between the cholesteric filter 61 and the second polarizer 64, then for a constant position of the polarizer 64, the colours are changed by rotating the delay layer. Through suitable choice of reflection wavelength and bandwidth for the cholesteric filter, and through suitable choice of the optical path difference and the direction of the optical axis of the delay layer, it is in this way possible to produce a broad palette of colours. Instead of between the cholesteric filter 61 and the polarizer 64, the delay layer may also be located between the input polarizer 63 and the cholesteric filter 61.

So long as an unstructured delay layer is used, the colour effects do not differ very greatly from those achieved using a single cholesteric layer between two polarizers. However when use is made of structured retarder layers in which the optical axis zonally has a different alignment, it is possible to produce locally different colours. One embodiment of an authentication element designed in this way is represented in FIG. 12. It consists of a first polarizer 72, placed on a substrate 71, a cholesteric layer 73 and a structured LCP retarder layer 74 with an associated PPN orientation layer 75. If this element is placed under an external polarizer 76 whose polarization direction is, for example, perpendicular to the polarization direction of the polarizer 72, then different colours are seen, the number of different colours depending on the structuring of the retarder layer 74 and being determined by the number of differently aligned optical axes. In this way, information can be represented in colour. This impressive optical effect is further enhanced in that the respective colours change when the polarizer 76 is rotated.

Furthermore, on account of the dependence of these selective reflection wavelengths on viewing angle, and on account of the optical path difference in the retarder layer, an authentication element of this type has a pronounced colour dependence on observation angle.

Further to structuring the direction of the optical axis, it is also possible to structure the optical delay in the retarder layer. It is thereby possible to optimize the appearance of colour using an additional parameter.

Although the combination of cholesteric filter and optical delay layer makes it possible to represent a large number of colours, it is nevertheless not possible with this arrangement to adjust the brightness of the colours over the full range from dark to bright. This can, however, be achieved by structuring the cholesteric filter, for example by locally removing the cholesteric layer by photolithography, or by shifting the reflection wavelength of the cholesteric filter when it is being produced by locally varying the path length in the invisible wavelength range. Since the cholesteric filter is not present, or is optically isotropic, at points treated in this way, only the retarder layer determines the optical behaviour at these points. In the case of crossed polarizers, it is for example possible for the optical axis to be set parallel to one of the polarizers, as a result of which the light at this point is blocked and therefore appears dark. By varying the ratio of the areas of dark and coloured regions, it is thus possible to control the brightness of the individual colours (mosaic picture).

As already mentioned above, the tilt effect described at the start in birefringent layers can also be produced in a different way than is already known, by means of which it is possible to make authentication elements whose tilt effect is more pronounced and whose production is even easier to carry out.

According to the invention, this is achieved in that at least one birefringent layer of the layer structure is constructed in such a way that its effective optical delay depends on the angle of observation in this case, the optical axis may lie in the plane of the layer, i.e. there is no need to pay the extra cost of tilting the optical axis out of the plane in defined fashion. The optical delay is equal to the product of the layer thickness and the optical anisotropy of the material, so that the optical delay for a given material can be adjusted by means of the layer thickness. Depending on the value of the optical delay, the layer appears with different colours or grey on observation using crossed polarisers. If the effect of optical delay is then dependent on the angle of observation, then the grey value or the colour changes correspondingly with the angle of observation. For example, with a material having positive, uniaxial optical anisotropy, the optical delay can be adjusted in such a way that the layer appears violet when observed vertically. If, however, the layer is viewed obliquely, in such a way that the viewing angle and the optical axis form a plane, then the colour changes from violet to yellow. If, however, one looks obliquely from a direction which is perpendicular to the optical axis, then the colour changes from violet to blue. With a corresponding position of the optical axis, it is thus possible to achieve the effect that, when the layer is tilted downward or upward, the colour changes from violet to yellow, while it changes to blue when the layer is tilted to the right or to the left.

This angular dependence of the optical delay can be employed to produce structured LCP authentication elements with information written in them, this information having an angle-dependent appearance. If, for example, an LCP layer is structured as described in EP-A-689084, in such a way that the optical axis of different regions are, in accordance with the information to be represented, either parallel or perpendicular to a reference axis lying in the plane of the layer, then the information cannot at first be seen under vertical observation with crossed polarizers. Only when the layer is observed obliquely does it become possible to see the pattern which has been written, since the angle of observation is then different for regions whose optical axes are perpendicular to one another. If the layer thickness is then again adjusted in such a way that the optical delay appears violet under the vertical observation, then the colour changes from violet to blue on tilting about the reference axis in those regions where the optical axis is parallel to the reference axis, while the colour in the other regions simultaneously changes from violet to yellow. If the layer is tilted upward or downward, then the information thus appears yellow on a blue background or blue on a yellow background if the layer is tilted to the left or to the right. Of course, by means of the layer thickness it is likewise possible to set other colours, grey values or combinations of colours with grey values. When grey values are used, a black and white effect is obtained instead of the colour effect.

In order to produce birefringent layers whose apparent image changes with the viewing angle, both uniaxially and biaxially birefringent materials are suitable. However, the dependence on viewing angle can be enhanced further by using optically biaxial materials. If, for example, the refractive index perpendicular to the plane of the layer is less than the refractive index in the plane of the layer, then the optical delay and therefore the tilt effect under oblique observation change much more than in the case of a uniaxial material.

Instead of using a biaxial material, the strong dependence of viewing angle can also be achieved by a layer structure made of two or more uniaxial layers, the optical axis in one layer being, for example, parallel or oblique with respect to the plane of the layer, while in a second layer it is perpendicular to the plane of the layer. Through suitable choice of the ratio between the layer thicknesses, the tilt effect can be made more intense or weaker. If, furthermore, the layer in which the optical axis is parallel or oblique with respect to the plane of the layer is also structured, that is to say the projection of the optical axis onto the plane of the layer points zonally in different azimuthal directions, then under crossed polarizers with oblique observation, a pattern is seen whose colours or grey values change with great effect when the observation angle is altered only slightly.

In a further illustrative embodiment, the strong dependence on viewing angle can also be achieved by a layer structure which contains an unstructured optically biaxial layer as well as a structured birefringent layer of optically uniaxial material. This can, for example, be brought about very simply by applying the structured birefringent layer directly onto an optically biaxial sheet.

Authentication elements having a dependence on viewing angle can also be made by using a substrate which can polarize incident light as a function of angle. This is, for example, the case with non-metallic smooth surfaces, for example glass or plastic. Obliquely incident light which is reflected from the surface of such materials is at least partly polarized. Under a particular angle of incidence (the Brewster angle), which depends on the respective material, the reflected light is in fact completely linearly polarized. If use is made of such a material with angle-dependent polarizing effect as a substrate for structured retarder layers, then obliquely incident light which is reflected from the surface of the substrate will be polarized before it passes again through the retarder layer. The polarization state is then changed as a function of the local direction of the optical axis, so that a pattern can be seen in a correspondingly structured retarder layer if a layer of this type is viewed obliquely through a polarizer. The optimum contrast is achieved if the layer is viewed at the Brewster angle. The pattern disappears completely when the angle of observation is normal.

Instead of birefringent layers, it is also possible to produce tilt effects by using layers which anisotropically absorb light. Layers of this type can, for example, be made with LCP layers in which dichroic dyes are incorporated. Since the dichroic dyes are oriented with the LCP molecules, the dichroic dyes can likewise be given a zonally different orientation through structured orientation of the LCP molecules. On passing through the layer, originally isotropic light then becomes linearly polarized, the polarization direction being locally different and determined by the local orientation of the LCP or dichroic molecules. Depending on the dye which is used, it is possible to polarize light within the visible range or only within a single wavelength range, so that the layers appear either grey or coloured. The pattern which is written can be seen if the layer is observed through a linear polarizer.

LCP layers which contain dichroic dyes exhibit absorption which depends on the viewing angle. If a uniaxially oriented LCP layer which is doped with dichroic dyes is tilted about the orientation direction of the LCP or dye molecules, then because of the increase in the optical path with increasing tilt angle, the layer appears darker than with a normal angle of observation. However, if the layer is tilted about an axis lying perpendicular to the LCP orientation direction in the plane of the layer, then the layer appears brighter since the absorption axis of the dye molecules is in this case oblique with respect to the incidence direction of the light, which has the result that a smaller proportion of the light is absorbed. In order to see these variations in brightness due to tilting, it is not absolutely necessary to observe the layer through a polarizer. If, for example, an LCP layer is then structured in such a way that, in different regions, the LCP molecule are parallel or perpendicular to one another, then when the layer is tilted about one of these two preferential directions, those regions with the LCP orientation parallel to the tilt axis appear darker, while the others appear brighter. Conversely, if the layer is tilted about the other preferential axis, then the brightness of the regions is interchanged. It is possible to see this effect as well without using an additional polarizer, and it is therefore particularly suitable for applications where the intention is to check an authentication element without an additional aid.

The production of a PPN and LCP layer which can be used according to the invention, as well as the production of an authentication element with a tilt effect, will be explained in more detail below.

1. Production of a PPN Layer

Suitable PPN materials include, for example, cinnamic acid derivatives.

For the investigations fundamental to the present invention, a PPN material with high glass point ($T_g$=133° C.) was chosen:

Polymer:

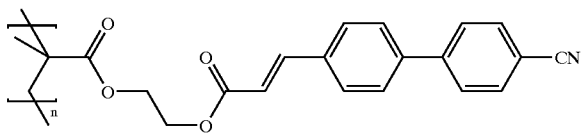

A glass plate was spin-coated with a 5 percent strength solution of the PPN material in NMP for one minute at 2000 rpm. The layer was then dried for one hour at 130° C. on a heating bench and for a further hour in a vacuum. The layer was then exposed to linearly polarized light, 200 W Hg high-pressure lamp for 5 minutes at room temperature. The layer was then used as an orientation layer for liquid crystals.

2. Mixture of Cross-linkable LC Monomers for the LCP Layer

In the examples, the following diacrylate components were used as cross-linkable LC monomers:

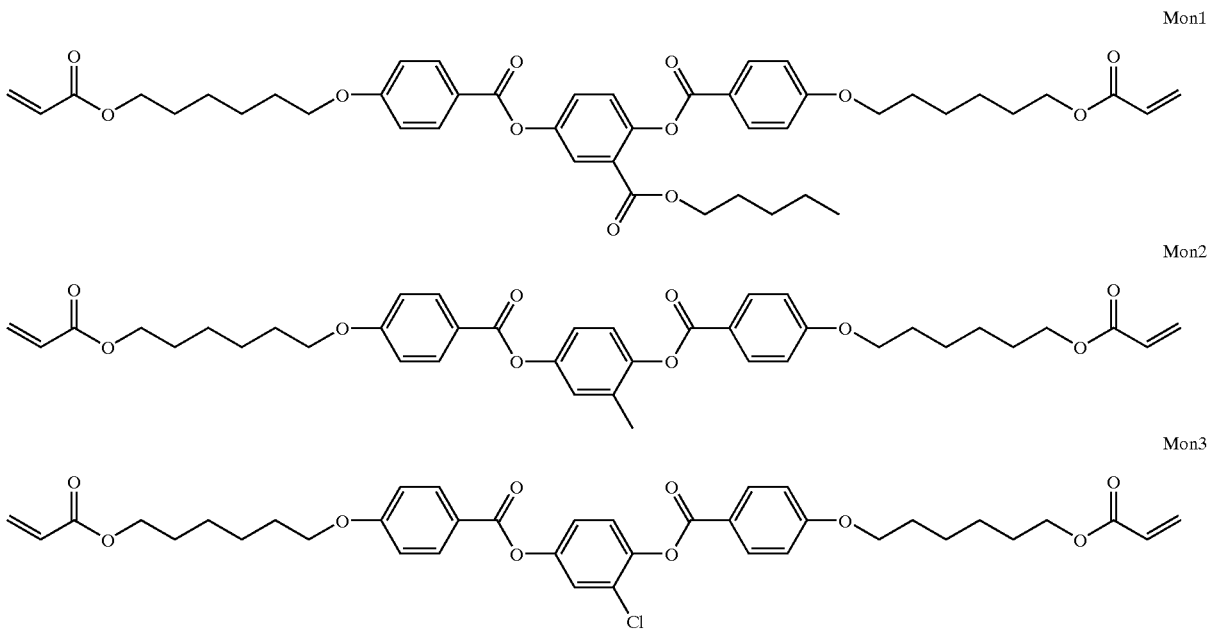

Using these components, a supercoolable nematic mixture $M_{LCP}$ with particularly low melting point (TM≈35° C.) was developed, making it possible to prepare the LCP layer at room temperature.

The diacrylate monomers were present with the following composition in the mixture:
Mon1 80%
Mon2 15%
Mon3 5%

In addition a further 2% of the Ciba-Geigy photoinitiator IRGACURE 369 were added to the mixture.

The mixture $M_{LCP}$ was then dissolved in anisol. By means of the $M_{LCP}$ concentration in anisol, it was possible to adjust the LCP layer thickness over a wide range.

For photoinitiated cross-linking of the LC monomers, the layers were exposed to isotropic light from a 150 W xenon lamp for about 30 minutes in an inert atmosphere.

3. Authentication Element with Tilt Effect

The two halves of a PPN-coated glass plate were exposed to polarized UV light, the polarization direction of the light when illuminating the second half being rotated through 90° relative to the first exposure. In each case, the other half was covered during the exposure. This gave two regions with planar, mutually perpendicular orientation directions.

A 5 percent strength solution of $M_{LCP}$ in anisol was produced. The solution was spun onto the PPN layer that had been exposed in the different ways. Spin parameters: 2 minutes at 1000 rpm. In order to optimize the orientation of the LC monomers, a coated substrate was then heated to just above the clearing point ($T_C$=67° C.). The layer was then cooled at a rate of 0.1° C./min to three degrees below the clearing point.

After the LC monomers had cross-linked, the thickness of the LCP layer which was obtained was about 80 nm.

If this layer is arranged between crossed polarizers in such a way that the orientation -directions of the LCP layer form an angle of 45° with the transmission directions of the polarizers, then the LCP layer appears uniformly grey. If, however, the layer is observed obliquely, with the viewing direction and the orientation direction of the left-hand half of the plate forming a plane, then the left-hand half of the plate appears darker while the right-hand half of the plate appears lighter.

To conclude, it should be pointed out that the optical effects described above, as well as the corresponding layer structures and material compositions, represent no more than a choice from a plurality of embodiments according to the invention, and may in particular be combined in a wide variety of ways in order to develop authenticating elements.

Thus, it is of course possible for any other kind of birefringent layer using which it is possible to produce an optical effect that can be employed, for example for authentication elements, to be put into the optical component instead of an LCP layer.

It is furthermore possible for the examples described above, instead of a PPN orientation layer, to use a different orientation layer which, according to the desired optical property and resolution, has the same or similar properties to a PPN layer. It is also conceivable to produce the orientation required for a retarder layer using a correspondingly structured substrate. A structured substrate of this type can, for example, be produced by embossing, etching and scratching.

Lastly, it should be pointed out that the multilayer structures according to the invention can be used not only as elements for safeguarding against forgery and copying, but for example can also be used to produce electro-optical liquid-crystal cells in which the LCP layer fulfils various optical and orienting functions.

What is claimed is:

1. Optical component comprising:
    a retarder, provided as a first liquid-crystal layer, having at least two regions with different optical axes and comprising a first anisotropic layer of cross-linked liquid-crystal monomers,
    a polarizer arranged over the first anisotropic layer of cross-linked liquid-crystal monomers, and
    an orientation layer and a second liquid-crystal layer both arranged over said polarizer, and wherein the second liquid crystal layer has at least two regions with different optical axes.

2. Optical component according to claim 1, further including a further polarizer arranged over the second liquid crystal layer, and a further orientation layer and a third liquid crystal layer arranged over the further polarizer, and wherein the third liquid-crystal layer has at least two regions with different optical axes.

3. Element for protection against forgery or copying, comprising: an optical component comprising:
    a retarder, provided as a first liquid-crystal layer, having at least two regions with different optical axes and comprising a first anisotropic layer of cross-linked liquid-crystal monomers,
    a polarizer arranged over the first anisotropic layer of cross-linked liquid-crystal monomers, and
    an orientation layer and a second liquid-crystal layer both arranged over the polarizer, wherein the second liquid-crystal layer has at least two regions with different optical axes, and
    an external linear or circular polarizer, wherein liquid-crystal layer encoding information can be analyzed using the external polarizer.

4. Element according to claim 3, wherein the at least two liquid-crystal layers each encode a partial information content which together form a total information content.

5. Device for protection against forgery or copying, wherein an element according to claim 4 and a linear or circular polarizer are arranged on a single substrate.

6. Device for protection against forgery or copying, wherein an element according to claim 3 and a linear or circular polarizer are arranged on a single substrate.

7. Element for protection against forgery or copying, comprising:
    an optical component comprising
        a substrate,
        a retarder placed on the substrate and having at least two regions with different optical axes and comprising an anistropic layer of cross-linked liquid-crystal monomers,
        wherein the substrate encodes a part of the total information content, and
        the retarder encodes another part of the total information content, which can be analyzed using an external polarizer.

8. Element for protection against forgery or copying, comprising:
    an optical component comprising
        a retarder having at least two regions with different optical axes and comprising an anisotropic layer of cross-linked liquid-crystal monomers, and
        an external linear polarizer,
        wherein the external linear polarizer is structured to encode part of the total information content, and
        both the retarder and the external polarizer each encode part of the total information content.

* * * * *

UNITED STATES PATENT AND TRADEMARK OFFICE
CERTIFICATE OF CORRECTION

PATENT NO. : 6,734,936 B1
DATED : May 11, 2004
INVENTOR(S) : Martin Schadt et al.

It is certified that error appears in the above-identified patent and that said Letters Patent is hereby corrected as shown below:

Title page,
Item [30], Foreign Application Priority Data,
"May 9, 1997  (SE).......... 1082/97" should read
-- May 9, 1997  (CH)......... 1082/97 --.
Item [57], ABSTRACT, "(PPN)-(-LPP)" should read -- (PPN)(=LPP) --.

Signed and Sealed this

Fifth Day of October, 2004

JON W. DUDAS
*Director of the United States Patent and Trademark Office*